United States Patent
Hurley

(10) Patent No.: US 7,039,130 B2
(45) Date of Patent: May 2, 2006

(54) RF RECEIVER PHASE CORRECTION CIRCUIT USING CORDIC AND VECTOR AVERAGING FUNCTIONS AND METHOD OF OPERATION

(75) Inventor: William M. Hurley, Wylie, TX (US)

(73) Assignee: Samsung Electronics Co., Ltd., Suwon-City (KR)

(*) Notice: Subject to any disclaimer, the term of this patent is extended or adjusted under 35 U.S.C. 154(b) by 806 days.

(21) Appl. No.: 10/147,953

(22) Filed: May 17, 2002

(65) Prior Publication Data
US 2003/0215030 A1    Nov. 20, 2003

(51) Int. Cl.
*H04L 27/22* (2006.01)
*H03D 3/22* (2006.01)
*H03D 3/00* (2006.01)

(52) U.S. Cl. .................. 375/326; 375/332; 329/304

(58) Field of Classification Search ............... 375/130, 375/226, 271, 279, 280, 316, 320, 322, 326, 375/329; 370/315, 319, 320, 328, 335, 342; 329/304, 313
See application file for complete search history.

(56) References Cited

U.S. PATENT DOCUMENTS

| | | | | |
|---|---|---|---|---|
| 5,049,830 A | * | 9/1991 | Yoshida | 329/306 |
| 5,712,870 A | * | 1/1998 | Petrick | 375/147 |
| 6,363,124 B1 | * | 3/2002 | Cochran | 375/326 |
| 6,625,231 B1 | * | 9/2003 | Shen | 375/316 |
| 6,781,447 B1 | * | 8/2004 | Linsky et al. | 329/304 |

* cited by examiner

*Primary Examiner*—Tesfaldet Bocure
*Assistant Examiner*—Naheed Ejaz

(57) ABSTRACT

A phase tracking circuit for use in a receiver having a raw in-phase (I) signal and a raw quadrature (Q) signal, where the raw I and Q signals have M discrete signal levels defining an M×M constellation. The phase tracking circuit corrects a phase error rotation angle $\phi$ associated with the M×M constellation. The phase tracking circuit comprising: 1) a phase rotation circuit for receiving and rotating the raw (I,Q) input vectors by an expected correction angle to produce corrected (I*,Q*) vectors; 2) a phase error calculation circuit for rotating each corrected (I*,Q*) vectors into the first quadrant, converting the rotated (I*,Q*) vectors to polar coordinates, subtracting an angle of each converted (I*,Q*) vectors from 45 degrees to produce difference angles, and adding each difference angle to the expected correction angle to produce an estimated correction angle value; and 3) an averaging circuit for calculating an average vector value from N estimated correction angle values, wherein the expected correction angle is derived from the average vector value.

21 Claims, 5 Drawing Sheets

US 7,039,130 B2

RF RECEIVER PHASE CORRECTION CIRCUIT USING CORDIC AND VECTOR AVERAGING FUNCTIONS AND METHOD OF OPERATION

TECHNICAL FIELD OF THE INVENTION

The present invention is directed, in general, to digital communication systems and, more specifically, to an phase correction circuit for use in a wireless network base station.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

CDMA modulation employs a spread spectrum technique for the transmission of information. The CDMA wireless communications system spreads the transmitted signal over a wide frequency band. This frequency band is typically substantially wider than the minimum bandwidth required to transmit the signal. A signal having a bandwidth of only a few kilohertz can be spread over a bandwidth of more than a megahertz.

All of the wireless access terminals, including both mobile stations and fixed terminals, that communicate in a CDMA system transmit on the same frequency. Therefore, in order for the base station to identify the wireless access terminals, each wireless access terminal is assigned a unique pseudo-random (PN) long spreading code that identifies that particular wireless access terminal to the wireless network. Typically, each long code is generated using the electronic serial number (ESN) of each mobile station or fixed terminal. The ESN for each wireless access terminal is unique to that wireless access terminal.

In some CDMA wireless networks, during the transmission of user data from a wireless access terminal to a base station (i.e., reverse channel traffic), the user data are grouped into 20 millisecond (msec.) frames. All user data transmitted on the reverse channel are convolutionally encoded and block interleaved to form a baseband signal. The baseband signal may then be modulated by an M-ary orthogonal modulation in which each N-bit data sequence or symbol is replaced by an orthogonal modulation code sequence of length $M=2^N$. The M-ary modulated signal is then spread using a long code based on the ESN data and then separated into an in-phase (I) component and a quadrature (Q) component prior to quadrature modulation of an RF carrier and transmission.

Next, the I-component is modulated by a zero-offset short pseudo-random noise (I-PN) binary code sequence. The Q-component is modulated by a zero-offset short pseudo-random noise (Q-PN) binary code sequence. In an alternate embodiment, the quadrature binary sequence may be offset by one-half of a binary chip time. Those skilled in the art will recognize that the in-phase component and the quadrature component are used for quadrature phase shift keying (QPSK) modulation of an RF carrier prior to transmission. Those skilled in the art will also recognize that the access terminal may use binary phase shift keying (BPSK) modulation, quadrature amplitude modulation (QAM) or, other digital modulation format for modulation of an RF carrier for transmission of the data signals prior to transmission.

In some systems, the in-phase (I) data and the quadrature (Q) data may be transmitted as binary data, wherein two signal amplitude levels are possible: +1 (i.e., Logic 1) or −1 (i.e., Logic 0). However, in many types of systems, more than two signal levels are used. For example, both I and Q may take on eight discrete signal amplitude levels, such as −4, −3, −2, −1, +1, +2, +3, and +4. Thus, baseband binary data may be grouped into three bit octets having values of 000 to 111. Each octet is then translated into one of the signal levels [−4, −3, −2, −1, +1, +2, +3, +4] and transmitted as a corresponding amplitude. Thus, the data pair (I,Q) may take on 64 possible values.

FIG. 4A illustrates (I,Q) constellation 400, which contains sixty-four (64) possible (I,Q) values represented in a (X,Y) Cartesian (rectangular) coordinate system, for I=−4, −3, −2, −1, +1, +2, +3, +4 and Q=−4, −3, −2, −1, +1, +2, +3, +4.

In a typical wireless CDMA system that utilizes non-coherent demodulation, the phase relationship between the transmitter and receiver is unknown. As a result, the (I,Q) constellation at the receiver is not optimally centered in each quadrant and may even rotate slowly.

FIG. 4B illustrates (I,Q) constellation 450, in which the 64 possible (I,Q) values shown in FIG. 4A are rotated by a phase rotation error angle $\phi$.

To compensate for this and to provide better demodulation of the received I and Q signals, a method of tracking and correcting the phase difference between the transmitter and receiver must be used. Some implementations incorporate phase tracking algorithms in the demodulation modems. There are two primary conventional methods of performing phase correction:

1) A modem is used for phase tracking and demodulation. This solution may not be desirable for testing reasons, where investigation is focused on a single hardware module that does not contain a modem. Additionally, in a production test environment, dedicating unnecessary resources (such as modems) to test various modules may not be desirable; and 2) An operator manually adjusts phase through manipulation of the transmitter or of the receiving circuitry. This solution is quite tedious, requiring significant manual input for every testing cycle. Additionally, the solution does not reject drifting of the phase due to equipment changes or frequency variations. Using a manual method of input, the operator only makes estimations of the optimum settings to correct any phase rotation and, therefore, any testing may have unnecessary errors introduced due to a less than optimum placement of the I/Q constellation.

Therefore, there is a need in the art for wireless networks that provide improved apparatuses and methods for tracking and correcting the phase difference between the transmitter and receiver. In particular, there is a need for a simple and robust phase-tracking apparatus that does not require a modem or operator intervention. Moreover, it is desirable that such a simple, robust phase-tracking algorithm be implemented in digital logic.

SUMMARY OF THE INVENTION

This invention provides a robust phase correction algorithm that tracks and corrects phase and frequency errors and is achievable in digital logic present in current designs.

To address the above-discussed deficiencies of the prior art, it is a primary object of the present invention to provide a phase tracking circuit for use in a receiver having front-end circuitry for down-converting an RF signal to produce a raw in-phase (I) signal and a raw quadrature (Q) signal, the raw I signal and the raw Q signal each having M discrete signal levels defining an M×M constellation of raw (I,Q) input vectors. The phase tracking circuit corrects a phase error rotation angle φ associated with the M×M constellation. According to an advantageous embodiment of the present invention, the phase tracking circuit comprising: 1) a phase rotation circuit capable of receiving the raw (I,Q) input vectors and rotating the raw (I,Q) input vectors by an expected correction angle to produce corrected (I*,Q*) vectors; 2) a phase error calculation circuit capable of rotating each of the corrected (I*,Q*) vectors into the first quadrant of a rectangular coordinate system, converting the rotated (I*,Q*) vectors to polar coordinates, subtracting an angle associated with each of the converted (I*,Q*) vectors from 45 degrees to thereby produce a plurality to difference angles, and adding each of the difference angles to the expected correction angle to produce a plurality of estimated correction angle values; and 3) an averaging circuit capable of calculating an average vector value from N of the plurality of estimated correction angle values, wherein the expected correction angle is derived from the average vector value.

According to one embodiment of the present invention, the phase rotation circuit comprises an angular rotation circuit capable of performing a CORDIC algorithm operable to rotate the raw (I,Q) input vectors.

According to another embodiment of the present invention, the phase error calculation circuit comprises a converter circuit capable of performing a CORDIC algorithm operable to convert the rotated (I*,Q*) vectors to polar coordinates.

According to yet another embodiment of the present invention, the averaging circuit comprises a sine-cosine lookup table capable of receiving the plurality of estimated correction angle values and outputting a plurality of normalized vectors derived from the plurality of estimated correction angle values.

According to still another embodiment of the present invention, the averaging circuit calculates the average vector value from N of the plurality of normalized vectors.

According to a further embodiment of the present invention, the phase tracking circuit further comprises a rotation angle generator circuit capable of receiving the average vector value and producing the expected correction angle.

According to a still further embodiment of the present invention, the rotation angle generator circuit comprises a converter circuit capable of performing a CORDIC algorithm operable to convert the average vector value to polar coordinates.

According to a yet further embodiment of the present invention, the phase tracking circuit further comprises a delay element capable of providing a time-delayed copy of the expected correction angle to an adder in the phase error calculation circuit.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed herein, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network base station.

Figure 1:
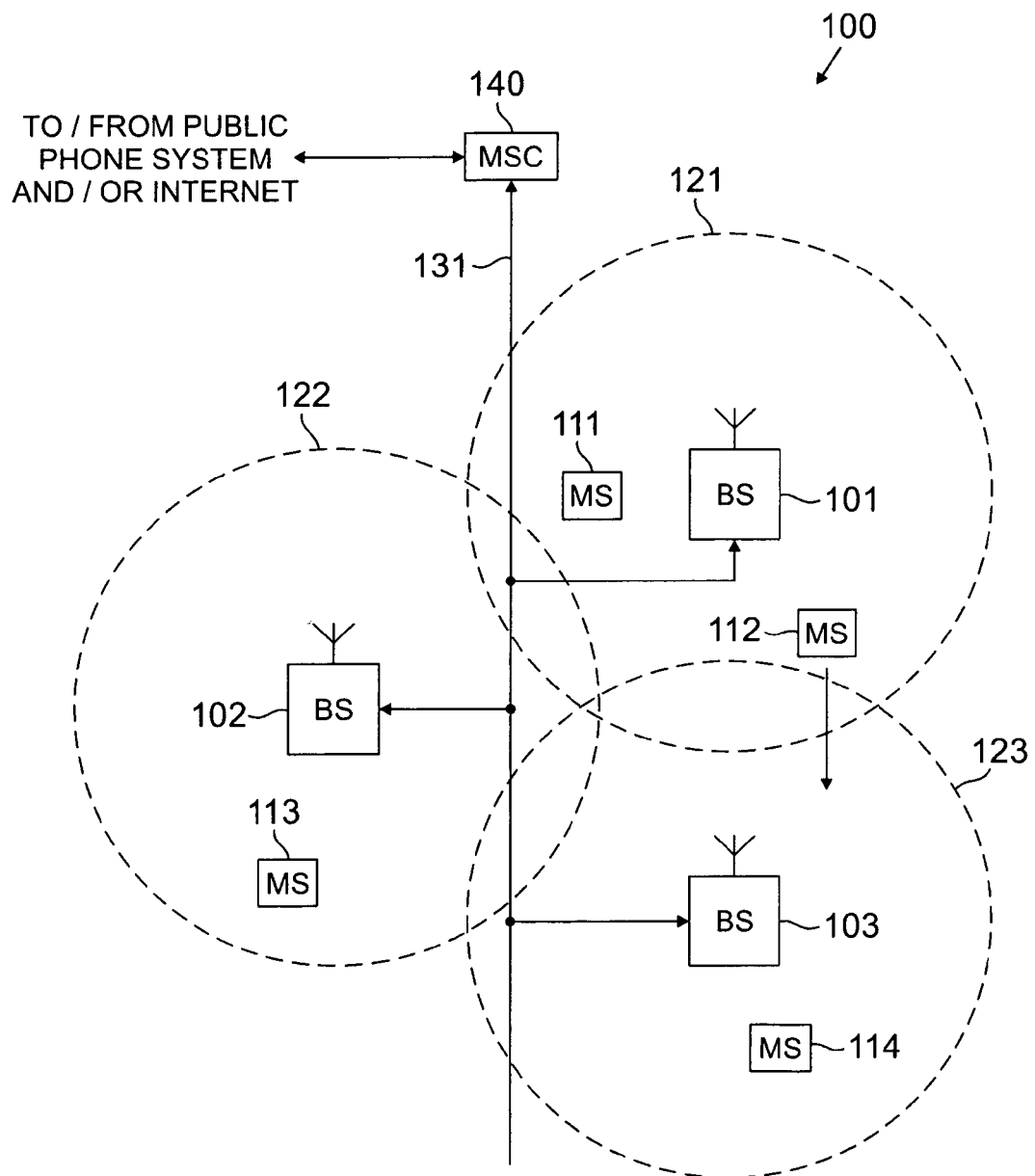
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 communicate with a plurality of mobile stations (MS) 111–114 over, for example, code division multiple access (CDMA) channels. Mobile stations 111–114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center MSC) 140. Line 131 also provides the connection path to transfers control signals between MSC 140 and BS 101, BS 102 and BS 103 used to establish connections for voice and data circuits between MSC 140 and BS 101, BS 102 and BS 103.

Communications line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may a provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103.

The above-described soft hand-off assumes the mobile station is in a voice or data call. An idle hand-off is a hand-off between cell sites of a mobile station that is communicating in the control or paging channel.

Figure 2:
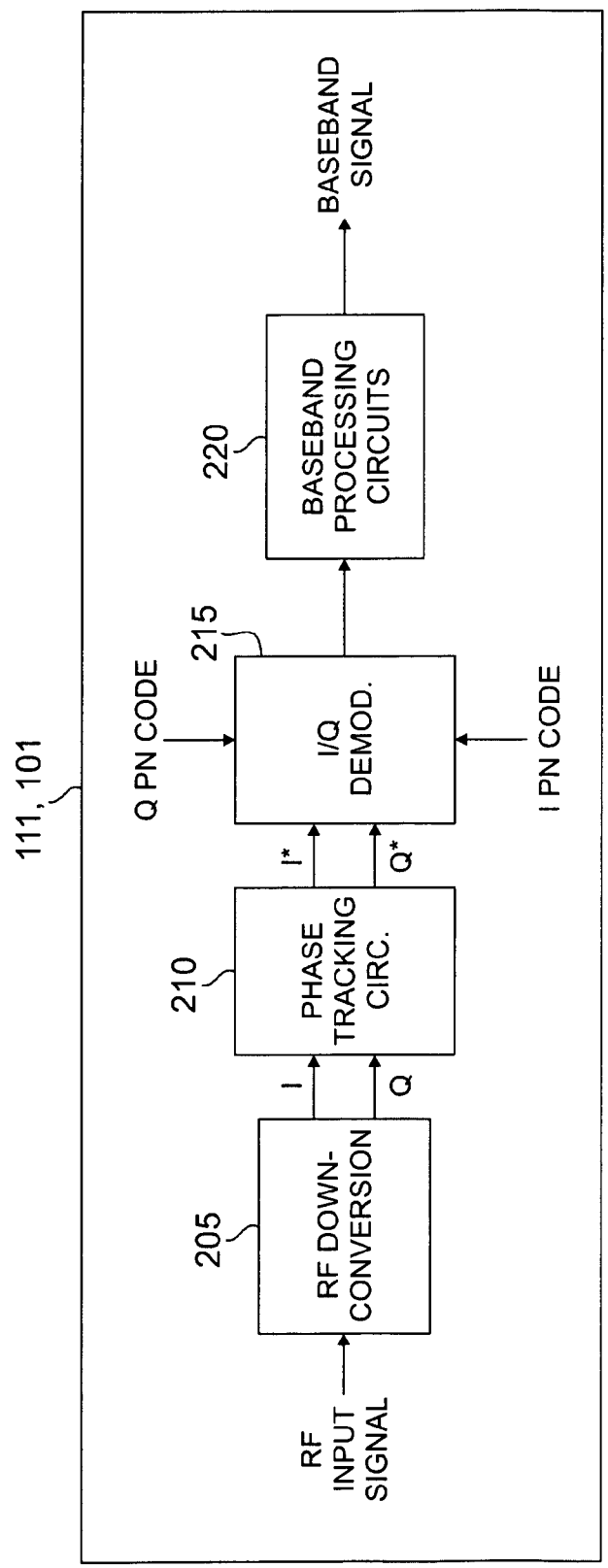
FIG. 2 illustrates selected portions of the receive path circuitry in a mobile station or a base station according to one embodiment of the present invention.

FIG. 2 illustrates selected portions of the receive path circuitry in mobile station 111 or base station 101 according to one embodiment of the present invention. The receive path comprises RF down-conversion block 205, phase tracking circuit 210, I/Q demodulation block 215, and baseband processing circuits 220. RF down-conversion block 205 mixes the RF input signal from the antenna with a $\sin(\omega t)$ reference carrier and a $\cos(\omega t)$ carrier reference to produce a raw in-phase (I) signal and a raw quadrature (Q) signal that may contain a phase rotation error angle $\phi$.

Figure 4A:
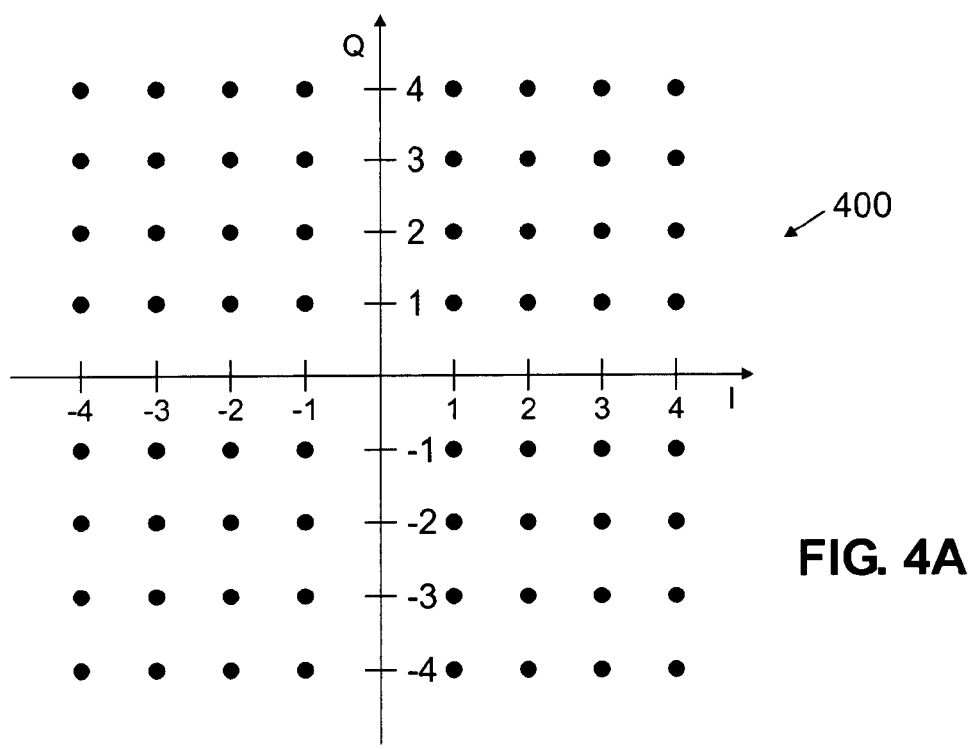
FIG. 4A illustrates an exemplary (I,Q) constellation, which contains 64 possible values of (I,Q), for I=−4, −3, −2, −1, +1, +2, +3, +4 and Q=−4, −3, −2, −1, +1, +2, +3, +4.

An exemplary constellation of raw I and Q values with no rotation error is shown in FIG. 4A. The exemplary (I,Q) constellation contains 64 possible values of (I,Q), where:

$I$=−4, −3, −2, −1, +1, +2, +3, +4; and $Q$=−4, −3, −2, −1, +1, +2, +3, +4.

Figure 4B:
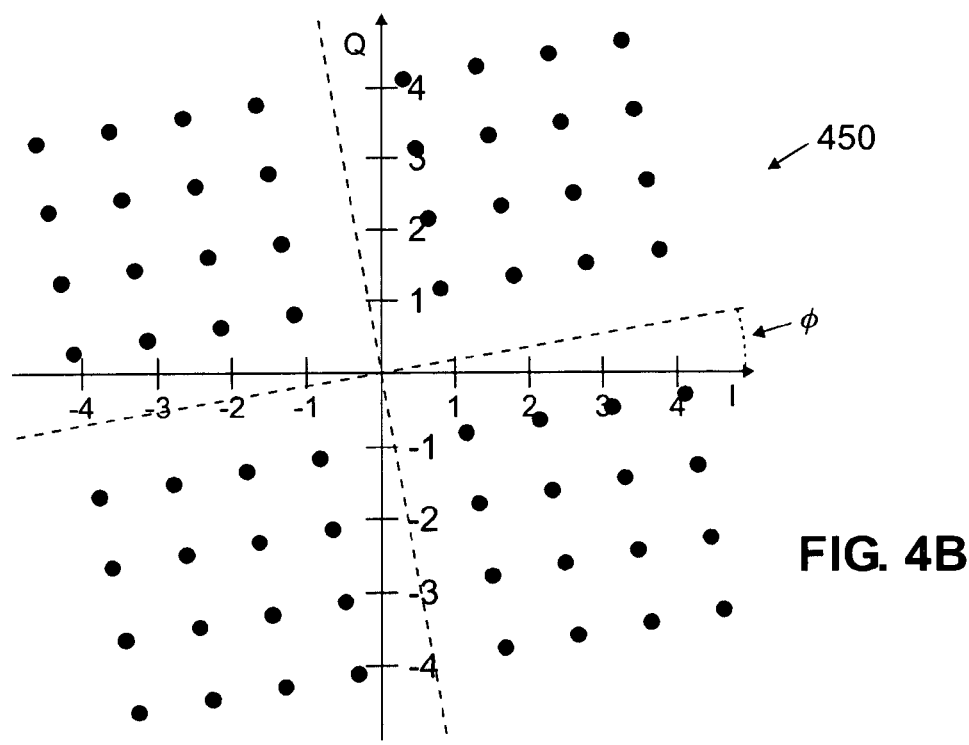
FIG. 4B illustrates an exemplary (I,Q) constellation, in which the 64 possible values of (I,Q) shown in FIG. 4A are rotated by a phase error angle φ.

FIG. 4B shows the exemplary (I,Q) constellation of FIG. 4A after the 64 possible values of (I,Q) have been rotated by a phase rotation error angle $\phi$.

Phase tracking circuit corrects (i.e., rotates) the raw I and Q signals to produce a corrected in-phase (I*) signal and a corrected quadrature (Q*) signal. I/Q demodulation block 215 despreads the I* and Q* signals to produce a composite baseband signal. Baseband processing circuit 220 further process the composite baseband signal to recover, for example, a traffic channel or a control channel (e.g., pilot, paging, synchronization, access).

Figure 3:
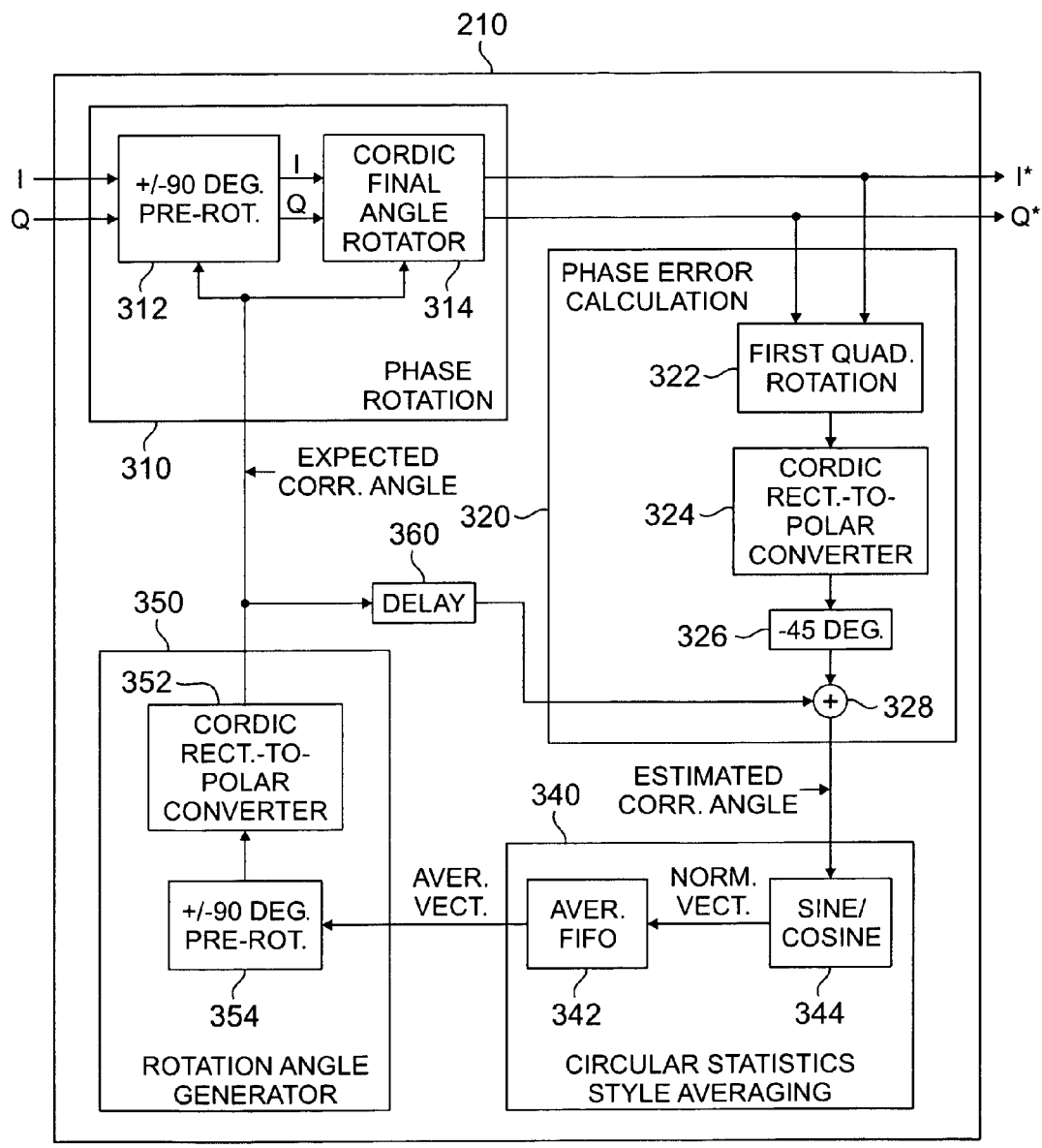
FIG. 3 illustrates a phase tracking circuit in the exemplary base station according to one embodiment of the present invention.

FIG. 3 illustrates phase tracking circuit 210 according to one embodiment of the present invention. Phase tracking circuit 210 comprises phase rotation block 310, phase error calculation block 320, circular statistics style averaging block 340, rotation angle generator 350 and delay element 360. Phase rotation block 310 comprises +/−90° pre-rotation circuit 312 and CORDIC final angle rotator circuit 314. Phase error calculation circuit 320 comprises first quadrant rotation circuit 322, CORDIC rectangular-to-polar converter circuit 324, subtractor 326, and adder 328. Circular statistics style averaging block 340 comprises sine-cosine lookup table 344 and averaging First In-First Out (FIFO) register 342. Rotation angle generator 350 comprises CORDIC rectangular-to-polar converter circuit 352 and +/−90° pre-rotation circuit 354.

In an advantageous embodiment, the present invention implements a number of computational circuits that implement the well-known Coordinate Rotation Digital Computing (CORDIC) algorithm. The CORDIC algorithm is a time and space efficient algorithm for calculating sine and cosine values of a given angle. It is a class of shift-add algorithms for rotating vectors in a plane, converting between polar and Cartesian (rectangular) coordinates, generating sine and cosine values, and vector magnitude calculation. CORDIC circuits comprises adders and shifter circuits and rely on shift operations to perform multiplication and division. The only costly operations in CORDIC circuits are additions. In alternate embodiments, non-CORDIC computation circuits may be used.

The present invention implements a closed loop system, described below in greater detail, that tracks static, varying, and rotating phase errors.

The raw I and Q values comprise an input vector that is first rotated by phase rotation block 310. The total rotation is determined by the Expected Correction Angle value received from rotation angle generator 350. CORDIC final angle rotator 314 is roughly limited to rotations of +/−90°. Therefore, if an expected correction angle between +90° and +180°, or between −90° and −179°, is received from rotation angle generator 350, +/−90° pre-rotation block 312 rotates the initial +90° or −90°, limiting CORDIC final angle rotator 314 to a maximum final rotation of +/−90°. Rotations of +/−90° are easily accomplished by swapping the I and Q values and negating the appropriate I or Q value, depending on the initial constellation quadrant of the I and Q values.

Thus, +/−90° pre-rotation block 312 and CORDIC final angle rotator 314 together correct the phase rotation error angle φ (see FIG. 4) that rotates the constellation of I and Q values. As explained above, the amount of correction rotation applied by +/−90° pre-rotation block 312 and CORDIC final angle rotator circuit 314 is determined by the value of Expected Correction Angle produced by rotation angle generator 350. CORDIC final angle rotator circuit 314 uses an iterative shift-and-add method for rotation of the vector that suits the architecture of common digital logic.

Figure 5:
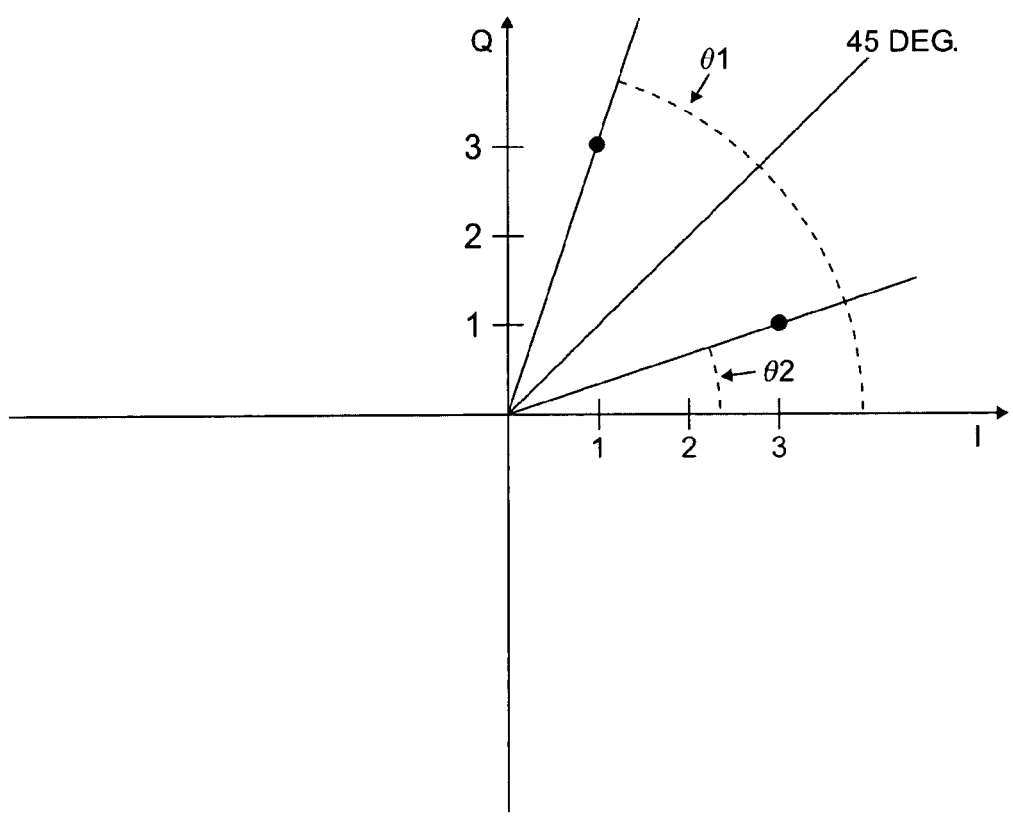
FIG. 5 illustrates the operation of the exemplary phase error calculation circuit in the phase tracking circuit according to one embodiment of the present invention.

Phase rotation block 310 allows the (I,Q) input vector to be rotated from −179° to 180°. Thus, the system can compensate for any phase error. Ideally, the output of phase rotation block 310 is a vector (I*,Q*) that has been rotated to where the (I,Q) constellation has been centered in each of the four quadrants, as shown in FIG. 5. However, in practice, the (I,Q) input vector drifts so that the actual phase rotation error angle φ of each (I,Q) input vector varies slightly from the Expected Correction Angle.

For example, a previous value of the phase rotation error angle φ may be +20 (counterclockwise rotation), which results in an Expected Correction Angle of −20° (clockwise rotation). If the next value of the phase rotation error angle φ changes to +22 degrees, the (I*,Q*) output vector from phase rotation block 310 will still contain a phase rotation error angle φ of +2° after correction.

Phase Error Calculation block 320 makes an estimate of the phase rotation error angle φ of the current output sample. First quadrant rotation circuit 32 comprises a simple circuit that rotates each vector to the first quadrant. This may be done by converting negative amplitudes to positive amplitudes, for example. Thus, the (I*,Q*) input vector (−2,+3) in the second quadrant becomes (+2,+3) in the first quadrant. CORDIC rectangular-to-polar converter circuit 324 performs a rectangular-to-polar coordinate conversion on the (I*,Q*) vector in the first quadrant. The angle of the resulting polar value is then subtracted from 45 degrees by subtractor 326 and is added to a time-delayed value of the Expected Correction Angle by adder 328. The output of adder 328 is the Estimated Correction Angle. This output is used to calculate an estimated correction angle for future rotations.

Circular statistics-style averaging block 340 limits the bandwidth of the feedback loop. Averaging angular data typically requires close attention to the boundary conditions at 0° and 360° or −179° and 180°. The present invention reduces the complexity required by deriving a normalized vector from the estimated angle using sine-cosine lookup table 344. The normalized vectors are averaged using variable-depth averaging FIFO 342 to adjust the loop bandwidth to the application.

The averaged vectors are passed through +/−90° pre-rotation circuit 354 and CORDIC rectangular-to-polar converter circuit 352 in rotation angle generator block 350 to perform a rectangular-to-polar conversion, yielding the angle of Expected Correction Angle. The resulting angle is used to control the rotation of the incoming I/Q data. It is noted that CORDIC rectangular-to-polar converter circuit 352 generates polar coordinates from rectangular coordinates by rotating the input vector to the X axis, not to the 0° axis. The angle traversed to the X axis is the polar value of the Expected Correction Angle.

Since the input vector is rotated to the X axis, rather than the 0° axis, any angle between 90° and 180°, or between −90° and −179°, would be rotated to the X axis at a position of 180° and the resulting polar angle would represent [180°—(actual angle)]. To correct this, +/−90° pre-rotation block 354 pre-rotates the vector to between 0° and 90° or between 0° and −90°. CORDIC rectangular-to-polar converter circuit 352 then rotates the resulting vector to the X axis, resulting in a polar value from 0° to 90° degrees or from 0° to −90°. If the initial vector was between −90° and 90° then the output of CORDIC rectangular-to-polar converter circuit 352 is complete. If the initial vector was >90° or <−90° then the output of CORDIC rectangular-to-polar converter circuit 352 is added to either 90° or −90° for the final complete angle.

The operation of phase error calculation block 320 and circular statistics style averaging block 340 may be better understood with reference to FIG. 5. FIG. 5 illustrates the operation of exemplary phase error calculation circuit 320 in phase tracking circuit 210 according to one embodiment of the present invention. Assume that Expected Correction Angle is −20°, the input phase rotation error angle φ is +20°, and the phase rotation error angle φ at (I*,Q*) output is 0° after correction by CORDIC final angle rotator 314. After rotation into the first quadrant by first quadrant rotation circuit 322, 32 of the 64 (I*,Q*) constellation points lie between 0 degrees and 45 degrees and the other 32 constellation points lie between 45 degrees and 90 degrees. Moreover, the 64 constellation points are symmetric about the 45 degree azimuth line shown in FIG. 5.

Two exemplary (I*,Q*) input vectors are shown in FIG. 5. One is located at (I*,Q*)=(3,1) and the other is located at (I*,Q*)=(1,3). When converted to polar coordinates, the (1,3) vector yields an angle of θ1=18.435°. When converted to polar coordinates, the (3,1) vector yields an angle of θ2=71.565. Subtractor 326 then subtracts θ1=18.435° from 45°, giving an output of 26.565 degrees. Subtractor 326 also subtracts θ2=71.565 from 45°, giving an output of −26.565 degrees. The difference angles are the same, but the sign is different. Thus, (I*,Q*)=(3,1) and (I*,Q*)=(1,3) are symmetric about the 45 degree azimuth.

It is noted that adding −26.565° and +26.565° results in a value of 0°. Dividing by 2 then give an average value of 0°. The same result would be obtained for other pairs of (I*,Q*) values, such as (I*,Q*)=(2,4) and (I*,Q*)=(4,2), or (I*,Q*)=(3,4) and (I*,Q*)=(4,3). Due to the random nature of the (I*,Q*) values, if a large number of (I*,Q*) values (i.e., 100 samples) are processed in this manner and the results are averaged in averaging FIFO register 342, the value of the average tends to be close to 0°. This is because, on average, each (I*,Q*) vector on one side of the 45° azimuth in FIG. 5 tends to be cancelled out by another (I*,Q*) vector on the other side of the 45° azimuth.

Adder 328 does not affect this cancellation property. In the example, Expected Correction Angle is −20°. When subtractor 326 subtracts θ1=18.435° from 45°, the output of 26.565 degrees is then added to −20°, giving an Estimated Correction Angle of +6.656°. When subtractor 326 subtracts θ2=75.565 from 45°, the output of −26.565 degrees is then added to −20°, giving an Estimated Correction Angle of −46.565. Averaging +6.565 and −46.565 gives and average of −20°. As before, the same result would be obtained for other pairs of (I*,Q*) values. If a large number of (I*,Q*) values (i.e., 100 samples) are processed in this manner and the results are averaged in averaging FIFO register 342, the value of the average tends to be close to −20°. Thus, adding −20° to the output of subtractor 326 simply changes the value of the average vector at the output of averaging FIFO register 342 by −20°.

All of the foregoing analysis assumed that the phase rotation error angle φ at (I*,Q*) output is 0° after correction by CORDIC final angle rotator 314. However, as noted above, the phase error in the raw (I,Q) values changes over time. Assume instead that Expected Correction Angle is −20°, the input phase rotation error angle φ is +22°, and the phase rotation error angle φ at (I*,Q*) output is 2° after correction by CORDIC final angle rotator 314.

If the exemplary (3,1) and (1,3) vectors are rotated by 2°, then the (3,1) vector yields an angle of θ2=73.565 and the (1,3) vector yields an angle of θ1=20.435°. Subtractor 326 then subtracts θ1=20.435° from 45°, giving an output of +24.565 degrees. Subtractor 326 also subtracts θ2=73.565 from 45°, giving an output of −28.565 degrees. The average of −28.565 and +20.435 is −2 degrees. The same result would be obtained for other pairs of (I*,Q*) values. If a large number of (I*,Q*) values (i.e., 100 samples) are processed in this manner and the results are averaged in averaging FIFO register 342, the value of the average tends to be close to −2° (excluding addition of −20° by adder 328). As noted above, adding −20° to the output of subtractor 326 in adder 328 changes the value of the average vector at the output of averaging FIFO register 342 by −20°. Thus, the value of the average vector at the output of averaging FIFO register 342 will change to −22°. This will change the value of Expected Correction Angle to −22°, which will in turn change the phase rotation error angle φ at (I*,Q*) output to 0° after correction by CORDIC final angle rotator 314.

The present invention provides a robust method for correcting phase errors and is easily incorporated into digital logic that is used for other functions. Therefore, with a relatively small additional cost in required resources, this invention can be added to designs and simplify testing significantly. The invention not only tracks static phase error or slight wander, but also tracks small frequency variations between the transmitter and receiver that cause the (I,Q) constellation to continually rotate, thus reducing the synchronization requirements necessary for testing.

Those skilled in the art will recognize that the (I,Q) constellation size (8×8) described above is merely by way of illustration and should not be construed in such as way as to limit the scope of the claims. In alternate embodiments of the present invention, other size constellations may be used (e.g., 4×4, 6×6, 16×16, and the like).

Although the present invention has been described in detail, those skilled in the art should understand that they can make various changes, substitutions and alterations herein without departing from the spirit and scope of the invention in its broadest form.

What is claimed is:

1. For use in a receiver having front-end circuitry for down-converting an RF signal to produce a raw in-phase (I) signal and a raw quadrature (Q) signal, said raw I signal and said raw Q signal each having M discrete signal levels defining an M×M constellation of raw (I,Q) input vectors, a phase tracking circuit for correcting a phase error rotation angle φ associated with said M×M constellation, said phase tracking circuit comprising:

a phase rotation circuit capable of receiving said raw (I,Q) input vectors and rotating said raw (I,Q) input vectors by an expected correction angle to produce corrected (I*,Q*) vectors;

a phase error calculation circuit capable of rotating each of said corrected (I*,Q*) vectors into the first quadrant of a rectangular coordinate system, converting said rotated (I*,Q*) vectors to polar coordinates, subtracting an angle associated with each of said converted (I*,Q*) vectors from 45 degrees to thereby produce a plurality to difference angles, and adding each of said difference angles to said expected correction angle to produce a plurality of estimated correction angle values; and an averaging circuit capable of calculating an average vector value from N of said plurality of estimated correction angle values, wherein said expected correction angle is derived from said average vector value.

2. The phase tracking circuit as set forth in claim 1 wherein said phase rotation circuit comprises an angular rotation circuit capable of performing a CORDIC algorithm operable to rotate said raw (I,Q) input vectors.

3. The phase tracking circuit as set forth in claim 1 wherein said phase error calculation circuit comprises a converter circuit capable of performing a CORDIC algorithm operable to convert said rotated (I*,Q*) vectors to polar coordinates.

4. The phase tracking circuit as set forth in claim 1 wherein said averaging circuit comprises a sine-cosine lookup table capable of receiving said plurality of estimated correction angle values and outputting a plurality of normalized vectors derived from said plurality of estimated correction angle values.

5. The phase tracking circuit as set forth in claim 4 wherein said averaging circuit calculates said average vector value from N of said plurality of normalized vectors.

6. The phase tracking circuit as set forth in claim 1 further comprising a rotation angle generator circuit capable of receiving said average vector value and producing said expected correction angle.

7. The phase tracking circuit as set forth in claim 6 wherein said rotation angle generator circuit comprises a converter circuit capable of performing a CORDIC algorithm operable to convert said average vector value to polar coordinates.

8. The phase tracking circuit as set forth in claim 7 further comprising a delay element capable of providing a time-delayed copy of said expected correction angle to an adder in said phase error calculation circuit.

9. A radio frequency (RF) receiver comprising:
front-end circuitry for down-converting an RF signal to produce a raw in-phase (I) signal and a raw quadrature (Q) signal, said raw I signal and said raw Q signal each having M discrete signal levels defining an M×M constellation of raw (I,Q) input vectors; and
a phase tracking circuit for correcting a phase error rotation angle φ associated with said M×M constellation, said phase tracking circuit comprising:
a phase rotation circuit capable of receiving said raw (I,Q) input vectors and rotating said raw (I,Q) input vectors by an expected correction angle to produce corrected (I*,Q*) vectors;
a phase error calculation circuit capable of rotating each of said corrected (I*,Q*) vectors into the first quadrant of a rectangular coordinate system, converting said rotated (I*,Q*) vectors to polar coordinates, subtracting an angle associated with each of said converted (I*,Q*) vectors from 45 degrees to thereby produce a plurality to difference angles, and adding each of said difference angles to said expected correction angle to produce a plurality of estimated correction angle values; and
an averaging circuit capable of calculating an average vector value from N of said plurality of estimated correction angle values, wherein said expected correction angle is derived from said average vector value.

10. The radio frequency (RF) receiver as set forth in claim 9 wherein the phase rotation circuit comprises an angular rotation circuit capable of performing a CORDIC algorithm operable to rotate the raw (I,Q) input vectors.

11. The radio frequency (RF) receiver as set forth in claim 9 wherein the phase error calculation circuit comprises a converter circuit capable of performing a CORDIC algorithm operable to convert the rotated (I*,Q*) vectors to polar coordinates.

12. The radio frequency (RF) receiver as set forth in claim 9 wherein the averaging circuit comprises a sine-cosine lookup table capable of receiving the plurality of estimated correction angle values and outputting a plurality of normalized vectors derived from the plurality of estimated correction angle values.

13. The radio frequency (RF) receiver as set forth in claim 12 wherein the averaging circuit calculates the average vector value from N of the plurality of normalized vectors.

14. The radio frequency (RF) receiver as set forth in claim 9 further comprising a rotation angle generator circuit capable of receiving the average vector value and producing the expected correction angle.

15. The radio frequency (RF) receiver as set forth in claim 14 wherein the rotation angle generator circuit comprises a converter circuit capable of performing a CORDIC algorithm operable to convert the average vector value to polar coordinates.

16. The radio frequency (RF) receiver as set forth in claim 15 further comprising a delay element capable of providing a time-delayed copy of the expected correction angle to an adder in the phase error calculation circuit.

17. For use in a receiver having front-end circuitry for down-converting an RF signal to produce a raw in-phase (I) signal and a raw quadrature (Q) signal, the raw I signal and the raw Q signal each having M discrete signal levels defining an M×M constellation of raw (I,Q) input vectors, a method of correcting a phase error rotation angle φ associated with the M×M constellation, the method comprising the steps of:
receiving the raw (I,Q) input vectors and rotating the raw (I,Q) input vectors by an expected correction angle to produce corrected (I*,Q*) vectors;
rotating each of the corrected (I*,Q*) vectors into the first quadrant of a rectangular coordinate system;
converting the rotated (I*,Q*) vectors to polar coordinates;
subtracting an angle associated with each of the converted (I*,Q*) vectors from 45 degrees to thereby produce a plurality to difference angles;
adding each of the difference angles to the expected correction angle to produce a plurality of estimated correction angle values;
calculating an average vector value from N of the plurality of estimated correction angle values; and
deriving a new expected correction angle from the average vector value.

18. The method as set forth in claim 17 wherein the step of rotating the raw (I,Q) input vectors by an expected correction angle to produce corrected (I*,Q*) vectors comprises the sub-step of performing a CORDIC algorithm operable to rotate the raw (I,Q) input vectors.

19. The method as set forth in claim 17 wherein the step of converting the rotated (I*,Q*) vectors to polar coordinates comprises the sub-step of performing a CORDIC algorithm operable to convert the rotated (I*,Q*) vectors to polar coordinates.

20. The method as set forth in claim 17 wherein the step of calculating an average vector value from N of the plurality of estimated correction angle values comprises the sub-step of using the received plurality of estimated correction angle values to retrieve from a sine-cosine lookup table a plurality of normalized vectors derived from the plurality of estimated correction angle values.

21. The method as set forth in claim 20 wherein the step of calculating an average vector value from N of the plurality of estimated correction angle values further comprises the sub-step of calculating the average vector value from N of the plurality of normalized vectors.

* * * * *